United States Patent [19]
Faigle

[11] Patent Number: 6,149,195
[45] Date of Patent: Nov. 21, 2000

[54] ELASTOMERIC STRUCTURE FOR DEPLOYING A VEHICLE OCCUPANT PROTECTION DEVICE

[75] Inventor: Ernst M. Faigle, Dryden, Mich.

[73] Assignee: TRW Vehicle Safety Systems Inc., Lyndhurst, Ohio

[21] Appl. No.: 09/212,103

[22] Filed: Dec. 15, 1998

[51] Int. Cl.[7] .................................................. B60R 21/06
[52] U.S. Cl. ........................................ 280/749; 280/730.2
[58] Field of Search ............................. 280/730.1, 730.2, 280/743.1, 749, 751

[56] References Cited

U.S. PATENT DOCUMENTS

| | | |
|---|---|---|
| 2,806,737 | 9/1957 | Maxwell . |
| 3,650,542 | 3/1972 | Shimano et al. ........................ 280/749 |
| 3,692,327 | 9/1972 | Barrick, Sr. et al. .................... 280/749 |
| 3,889,970 | 6/1975 | Asteimer et al. ....................... 280/749 |
| 5,112,081 | 5/1992 | Kesseru ................................. 280/749 |
| 5,232,244 | 8/1993 | Itoh ....................................... 280/749 |
| 5,265,903 | 11/1993 | Kuretake et al. . |
| 5,480,181 | 1/1996 | Bark et al. . |
| 5,547,219 | 8/1996 | Ha ......................................... 280/749 |
| 5,707,075 | 1/1998 | Kraft et al. .......................... 280/730.2 |

FOREIGN PATENT DOCUMENTS 2297950A  8/1996  United Kingdom .

*Primary Examiner*—Brian L. Johnson
*Assistant Examiner*—Bryan Fischmann
*Attorney, Agent, or Firm*—Tarolli, Sundheim, Covell, Tummino & Szabo L.L.P.

[57] ABSTRACT

An apparatus (10) includes a vehicle occupant protection device (12) and an elastic structure (22) engaged with the protection device (12). The protection device (12) is movable to a deployed condition in which it is configured to restrain movement of a vehicle occupant under the influence of vehicle crash forces. The elastic structure (22) moves the protection device (12) toward the deployed condition upon deflecting elastically from a first stressed condition to a second, less stressed condition.

17 Claims, 2 Drawing Sheets

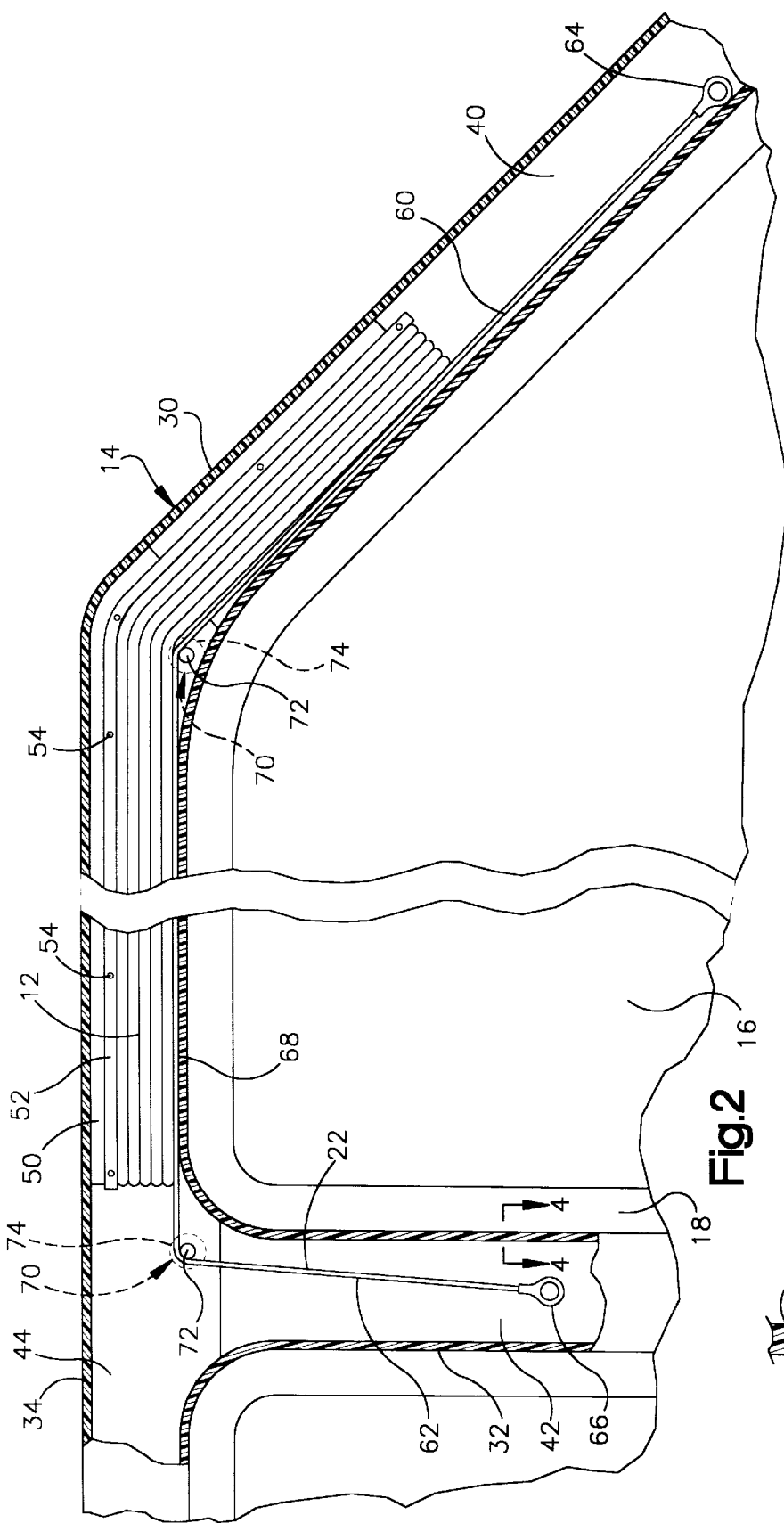
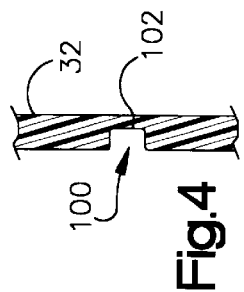
Fig. 2
Fig. 4

ELASTOMERIC STRUCTURE FOR DEPLOYING A VEHICLE OCCUPANT PROTECTION DEVICE

FIELD OF THE INVENTION

The present invention relates to a vehicle occupant protection device, and particularly relates to deployment of the protection device in a vehicle occupant compartment.

BACKGROUND OF THE INVENTION

Vehicle crash forces may tend to move an occupant of a vehicle within the vehicle occupant compartment. For example, side impact crash forces and rollover crash forces may tend to move a vehicle occupant toward a window at the side of the vehicle. Front impact and rear impact crash forces may tend to move an occupant of a front seat toward the windshield, and may tend to move an occupant of a rear seat toward the rear window. Therefore, a vehicle may be equipped with a curtain for restraining movement of an occupant toward a window under the influence of vehicle crash forces.

SUMMARY OF THE INVENTION

In accordance with the present invention, an apparatus comprises a vehicle occupant protection device and an elastic structure engaged with the protection device. The protection device is movable to a deployed condition in which it is configured to restrain movement of a vehicle occupant under the influence of vehicle crash forces. The elastic structure moves the protection device toward the deployed condition upon deflecting elastically from a first stressed condition to a second, less stressed condition.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 2 is an enlarged sectional view showing the apparatus of FIG. 1 in a different condition;

FIG. 4 is a view taken on line 4—4 of FIG. 2; and

DESCRIPTION OF PREFERRED EMBODIMENTS

Figure 1:
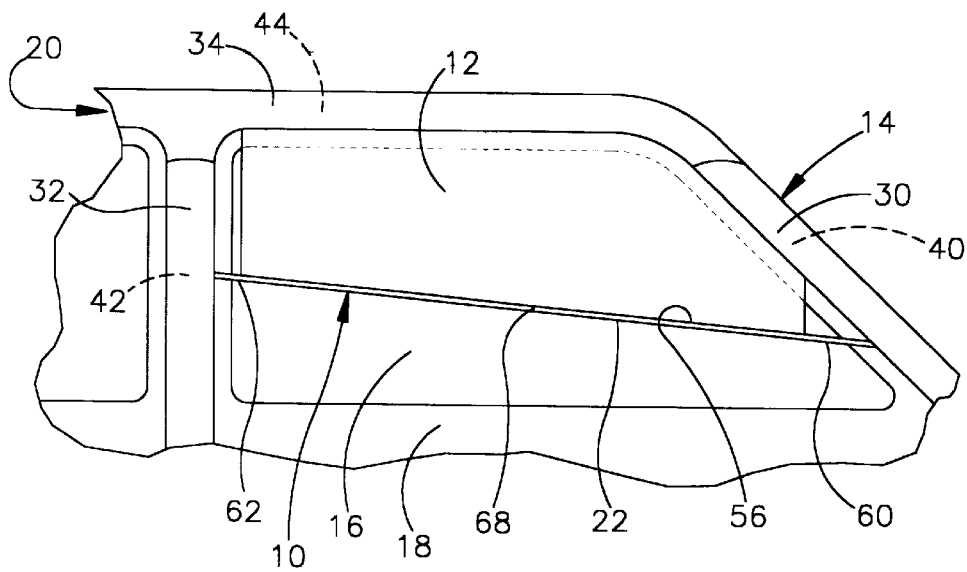
FIG. 1 is a side view of an apparatus comprising a first embodiment of the present invention.

A vehicle occupant protection apparatus 10 comprising a first embodiment of the present invention is shown partially in FIG. 1. The protection apparatus 10 includes a particular type of vehicle occupant protection device 12 which is known as a side curtain. The side curtain 12 is mounted in a frame 14 which extends along three sides of a window 16 in a door 18 at the side of a vehicle 20. When the side curtain 12 is in the deployed condition shown in FIG. 1, it extends across the window 16 to help restrain movement of a vehicle occupant in a direction outward of the window 16 under the influence of vehicle crash forces. The apparatus 10 further includes an elastic structure in the form of an elastomeric band 22. The elastomeric band 22 moves the side curtain 12 to the deployed condition upon the occurrence of a vehicle crash.

The frame 14 has structural steel portions and plastic trim portions that cover the structural steel portions. The plastic trim portions 30, 32 and 34 that are shown in FIG. 1 cover structural steel portions including an A-pillar 40 at the forward end of the door 18, a B-pillar 42 at the rear end of the door 18, and a roof rail 44 above the door 18.

As shown in FIG. 2, the apparatus 10 is stored within the frame 14 between the plastic trim portions 30, 32, and 34 and the A-pillar 40, B-pillar 42, and roof rail 44 of the frame 14. The side curtain 12 is stored in a rolled or folded configuration extending along the roof rail 44 and the A-pillar 40. An upper edge portion 50 of the side curtain 12 is fixed to those roof rail 44 and A-pillar 40 of the frame 14 by a retainer strip 52 and a plurality of fasteners 54. A lower edge portion 56 (FIG. 1) of the side curtain 12 is fixed to the elastomeric band 22 by the use of an adhesive bond, stitching, fasteners or the like.

The elastomeric band 22 has a forward end section 60 and a rear end section 62. The forward end section 60 is mounted on the A-pillar 40 by a pivotable anchor structure 64. The rear end section 62 is mounted on the B-pillar 42 by another pivotable anchor structure 66. An intermediate section 68 of the elastomeric band 22 extends along the roof rail 44 and the A-pillar 40 between the opposite end sections 60 and 62. The lower edge portion 56 (FIG. 1) of the side curtain 12 is fixed to the intermediate section 68 of the elastomeric band 22, as described above, fully along the length of the lower edge portion 56.

A pair of disengageable anchor structures 70 retain the elastomeric band 20 in the configuration of FIG. 2 under ordinary vehicle operating conditions. Each disengageable anchor structure 70 in the first embodiment of the invention includes a movable anchor stud 72 and an actuator for moving the anchor stud 72. Each actuator comprises a solenoid 74 which is mounted within the roof rail 44. Each anchor stud 72 is connected to a plunger (not shown) in the corresponding solenoid 74 and projects a short distance outward from the roof rail 44.

The elastomeric band 22 extends over the mounting studs 72 when the apparatus is stored within the frame 14, as shown in FIG. 2. In accordance with the present invention, the elastomeric band 22 has an original unstretched condition with a length that is not greater than the shortest distance between the two pivotable anchor structures 64 and 66. Accordingly, when the apparatus 10 is stored within the frame 14, the disengageable anchor structures 70 support and retain the elastomeric band 22 in a stretched condition from which it is elastically contractible toward its original, unstretched condition.

Figure 3:
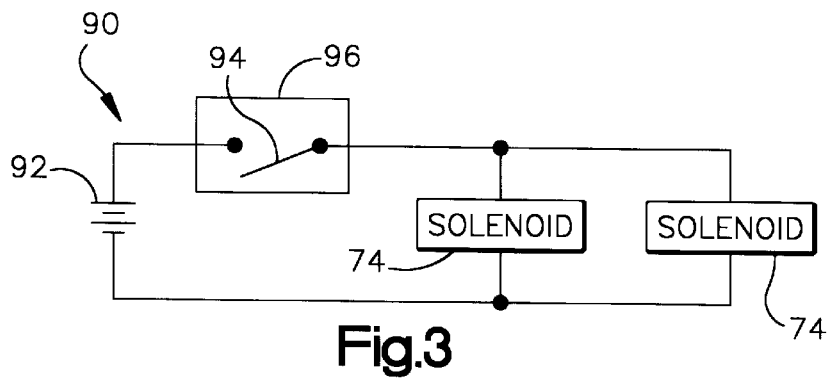
FIG. 3 is a schematic view of an electrical circuit including parts of the apparatus of FIG. 1.

As shown schematically in FIG. 3, the solenoids 74 are connected in an electrical circuit 90 with a power source 92 and a normally open switch 94. The power source 92 preferably comprises the vehicle battery and/or a capacitor. The switch 94 is part of a sensor 96 which senses one or more vehicle conditions indicating the occurrence of a crash. If such a crash-indicating condition meets or exceeds a specified threshold level, the switch 94 closes and electric current is directed through the solenoids 74 to actuate the solenoids 74. The anchor studs 72 are then retracted into the roof rail 44 and are thus moved out of supporting engagement with the elastomeric band 22. In this manner, the elastomeric band 22 is released to contract from the stretched condition of FIG. 2 to the relatively unstretched condition of FIG. 1, and thereby to pull the side curtain 12 downward across the window 16 from the stored condition of FIG. 2 to the deployed condition of FIG. 1.

In accordance with a particular feature of the present invention, a groove 100 (FIG. 4) extends along the plastic trim portions 30, 32 and 34 of the frame 14 generally coextensive with the elastomeric band 22. The groove 100 is presented toward the elastomeric band 22 and is located in the path of movement of the band 22 as the band 22 contracts. A thin section 102 of plastic material at the bottom of the groove 100 defines a stress riser which is coextensive with the groove 100. The stress riser 102 is rupturable under the force applied by the elastomeric band 22 when the elastomeric band 22 contracts into contact with the plastic trim portions 30, 32 and 34 of the frame 14. Such rupturing of the stress riser 102 provides an elongated slot through which the protection apparatus 10 can emerge from the frame 14 and move into the vehicle occupant compartment upon deployment of the side curtain 12.

Figure 5:
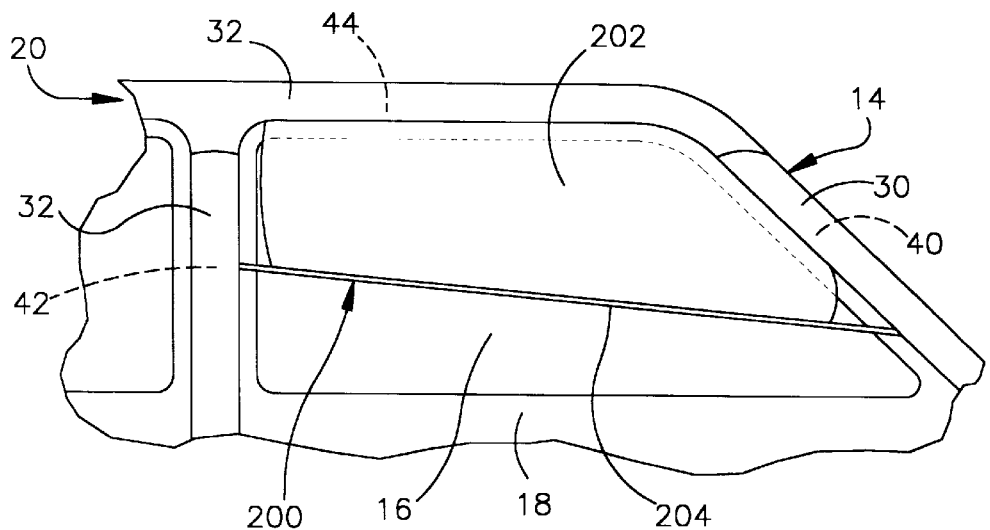
FIG. 5 is a view similar to FIG. 1 showing an apparatus comprising a second embodiment of the present invention.

An apparatus 200 comprising a second embodiment of the present invention is shown partially in FIG. 5. The apparatus 200 includes an inflatable side curtain 202 in place of the side curtain 12 described above. The apparatus 200 further includes a known source of inflation fluid (not shown) for inflating the side curtain 202 upon the occurrence of a vehicle crash. The apparatus 200 is otherwise the same as the apparatus 10, and thus includes an elastic structure in the form of an elastomeric band 204. The elastomeric band 22 pulls the side curtain 202 to the deployed condition of FIG. 5 in the same manner that the elastomeric band 22 pulls the side curtain 12 to the deployed condition of FIG. 1. The force of the inflation fluid flowing into the side curtain 202 also urges the side curtain 202 to its deployed condition.

From the above description of the invention, those skilled in the art will perceive improvements, changes and modifications. Such improvements, changes and modifications within the skill of the art are intended to be covered by the appended claims.

What is claimed is:

1. Apparatus comprising:
   a vehicle occupant protection device movable to a deployed condition in which said protection device is configured to restrain movement of a vehicle occupant under the influence of vehicle crash forces; and
   an elastic structure which can deflect elastically, said elastic structure comprising an elastomeric band which is elastically contractible lengthwise from a first stressed condition to a second, less stressed condition, said elastomeric band being engaged with said protection device so as to move said protection device toward said deployed condition upon deflecting elastically from said first stressed condition toward said second, less stressed condition, said elastomeric band having an intermediate section engaging said protection device and a pair of opposite end sections extending away from said protection device.

2. Apparatus as defined in claim 1, further comprising a disengageable anchor structure engaged with said elastomeric band so as to retain said elastomeric band in said first stressed condition under ordinary vehicle operating conditions.

3. Apparatus as defined in claim 2, further comprising means for sensing and responding to a vehicle crash condition by disengaging said anchor structure from said elastomeric band.

4. Apparatus as defined in claim 1 wherein said protection device has a lower edge which extends across a vehicle window when said protection device is in said deployed condition, said intermediate section of said band engaging said protection device along said lower edge of said protection device.

5. Apparatus as defined in claim 1 wherein said protection device comprises an inflatable structure, said elastomeric band being engaged with said inflatable structure so as to move said inflatable structure into a vehicle occupant compartment upon deflecting elastically from said first stressed condition toward said second, less stressed condition.

6. Apparatus comprising:
   a vehicle occupant protection device mounted in a vehicle, said protection device being movable to a deployed condition in which said protection device is configured to restrain movement of a vehicle occupant under the influence of vehicle crash forces; and
   an elastomeric band mounted in said vehicle in a first stressed condition, said elastomeric band being engaged with said protection device and being elastically contractible lengthwise to move said protection device toward said deployed condition from said first stressed condition toward a second, less stressed condition, said elastomeric band having an intermediate section engaging said protection device and a pair of opposite end sections extending away from said protection device.

7. Apparatus as defined in claim 6, further comprising a disengageable anchor structure engaged with said elastomeric band so as to retain said elastomeric band in said first stressed condition under ordinary vehicle operating conditions.

8. Apparatus as defined in claim 7, further comprising means for sensing and responding to a vehicle crash condition by disengaging said anchor structure from said elastomeric band.

9. Apparatus as defined in claim 6 wherein said protection device comprises an inflatable structure, said elastomeric band being engaged with said inflatable structure so as to move said inflatable structure into a vehicle occupant compartment upon contracting from said first stressed condition.

10. Apparatus as defined in claim 6 wherein said protection device has a lower edge which extends across a vehicle window when said protection device is in said deployed condition, said intermediate section of said band engaging said protection device along said lower edge of said protection device.

11. Apparatus as defined in claim 10 wherein said opposite end sections of said band are pivotably anchored in said vehicle.

12. Apparatus comprising:
   a vehicle occupant protection device mounted in a vehicle, said protection device being movable to a deployed condition in which said protection device is configured to restrain movement of a vehicle occupant under the influence of vehicle crash forces;
   an elastic structure mounted in said vehicle in a first stressed condition, said elastic structure being engaged with said protection device so as to move said protection device toward said deployed condition upon deflecting elastically from said first stressed condition toward a second, less stressed condition, said elastic structure having an intermediate section engaging said protection device and a pair of opposite end sections extending away from said protection device; and
   a disengageable anchor structure engaged with said elastic structure so as to retain said elastic structure in said first stressed condition under ordinary vehicle operating conditions.

13. Apparatus as defined in claim 12 further comprising means for sensing and responding to a vehicle crash condition by disengaging said anchor structure from said elastic structure.

14. Apparatus as defined in claim 12 wherein said elastic structure is an elastomeric band which is elastically contractible lengthwise from said first stressed condition to said second, less stressed condition.

15. Apparatus as defined in claim 12 wherein said protection device comprises an inflatable structure, said elastomeric band being engaged with said inflatable structure so as to move said inflatable structure into a vehicle occupant compartment upon contracting from said first stressed condition.

16. Apparatus as defined in claim 12 wherein said protection device has a lower edge which extends across a vehicle window when said protection device is in said deployed condition, said intermediate section of said band engaging said protection device along said lower edge of said protection device.

17. Apparatus as defined in claim 16 wherein said opposite end sections of said band are pivotably anchored in said vehicle.

* * * * *